United States Patent [19]

Seidl

[11] 4,342,119

[45] Jul. 27, 1982

[54] MULTI-TONE JAMMER

[75] Inventor: Loren R. Seidl, Irvine, Calif.

[73] Assignee: The United States of America as represented by the Secretary of the Air Force, Washington, D.C.

[21] Appl. No.: 181,940

[22] Filed: Aug. 27, 1980

[51] Int. Cl.[3] .......................... H04K 3/00; H04B 1/04

[52] U.S. Cl. .......................................... 455/1; 331/47; 331/78; 343/18 E; 375/1; 455/108

[58] Field of Search ................... 455/1, 110, 112, 113, 455/115, 118, 119, 161, 164, 226, 108; 375/1; 343/18 E; 331/47, 78, 178

[56] References Cited

U.S. PATENT DOCUMENTS

| | | | |
|---|---|---|---|
| 3,706,940 | 12/1972 | Hausner | 331/76 |
| 3,731,198 | 5/1973 | Blasbalg | 375/1 |
| 3,955,200 | 5/1976 | Miller | 343/18 R |
| 3,971,923 | 7/1976 | Linder | 328/181 |
| 4,017,856 | 4/1977 | Wiegand | 455/1 |
| 4,052,673 | 10/1977 | Herzog | 455/112 |

*Primary Examiner*—Marc E. Bookbinder
*Attorney, Agent, or Firm*—Donald J. Singer; Willard R. Matthews

[57] ABSTRACT

A waveform capable of jamming some or all of the channels of a multiple channel receiver is developed by a multi-tone jammer that uses a digital counter and a digital/analog converter to generate a ramp voltage for a voltage controlled oscillator (VCO). The output of the VCO is modulated by a pin diode attenuator. The attenuator is controlled by a pattern generator synchronized with the digital counter to blank the retrace and any portion of the sweep to provide a partial band tone jamming spectrum. The digital counter is driven by a MHz reference signal generator and the sweep repetition rate is greater than the circuit bandwidth.

9 Claims, 3 Drawing Figures

FIG. 1
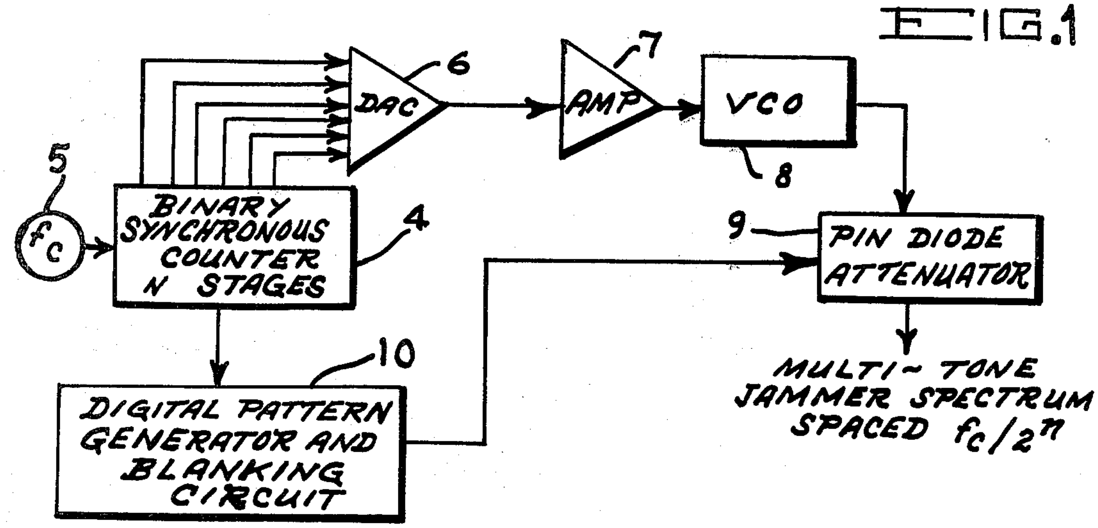
FIG. 2a
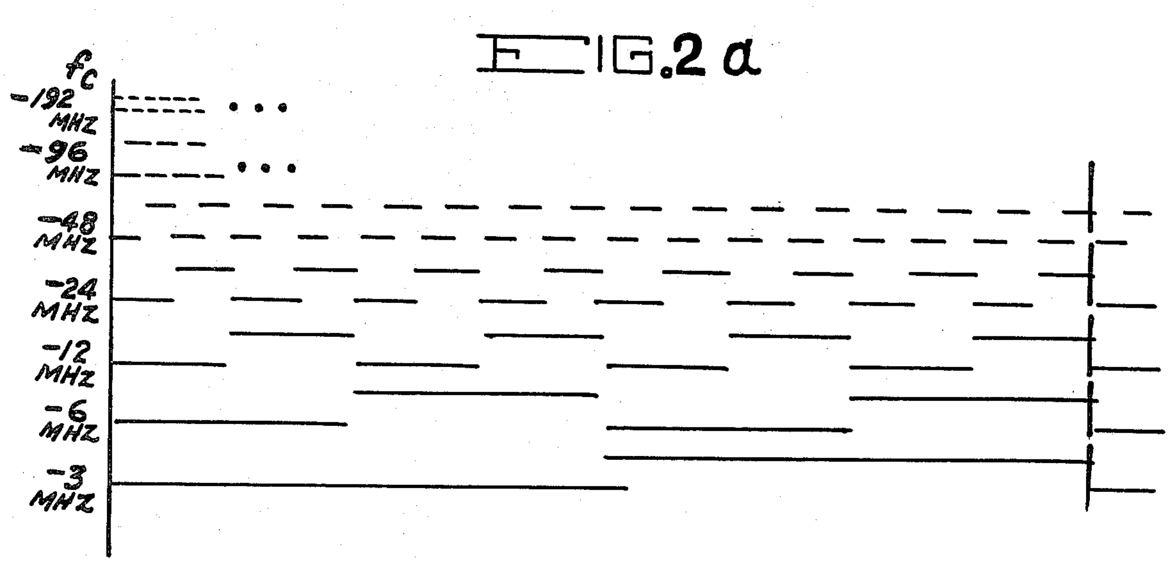
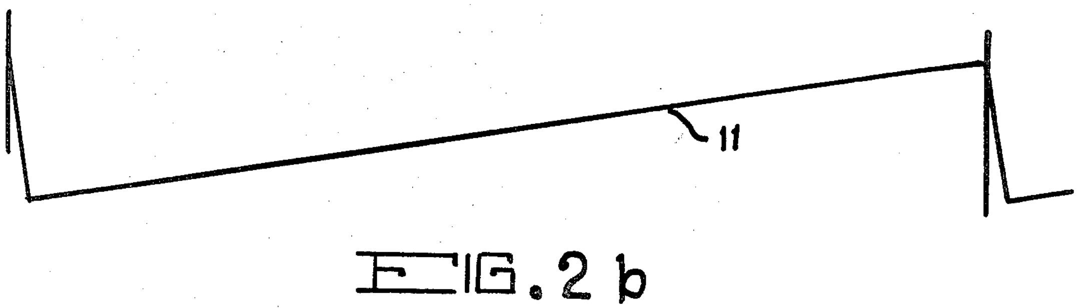
FIG. 2b

MULTI-TONE JAMMER

STATEMENT OF GOVERNMENT INTEREST

The invention described herein may be manufactured and used by or for the Government for governmental purposes without the payment of any royalty thereon.

BACKGROUND OF THE INVENTION

This invention relates to multi-tone jammers and in particular to a digitally implemented device that optimizes the performance of a swept single voltage controlled oscillator (VCO) whereby multiple tones and flatness of tone spectrum are achieved.

The current state of-the-art approach to producing this function is to employ implementations that utilize multiple oscillators which are tuned and adjusted for a spectrum of tones. However, analog sweep generation using R-C time constants will not provide necessary flatness of spectrum or stability of tones when sweeping a single VCO. Tone generation through linear sweep operation of a VCO requires a ramp generation of excellent linearity, fast retrace capability and stable repetitive cycles. These characteristics are noticably improved upon with the digitized sweep generation and modulation provided by the present invention. This approach to implementation of the multitone jammer results in fewer components (oscillators, filters and analog elements) than any previously known design. Also, the requirements for matching phase and amplitude of RF components is eliminated, thereby eliminating the need for adjustments or for critical component selection. The digitally implemented ramp waveform generators that are currently available are not suitable to use as multi-tone jammers. U.S. Pat. No. 3,971,923 entitled "Ramp Function Generator" issued to John L. Linden, July, 27, 1976 illustrates such a device. Ramp function generators of this type generally operate on low frequency (25 Hz) input signals. They cannot achieve the MHz sweep repetition rates necessary for multi-tone generation with a single VCO and appropriate VCO output modulation means are not generally available.

SUMMARY OF THE INVENTION

The invention consists of a multi-tone jammer implemented with a digitized sweep generation which modulates a single VCO. The sweep generator consists of a high speed digital counter design and digital/analog converter. PIN diode attenuators on the VCO output are controlled by synchronously derived signals so as to blank any portion of the sweep, producing an electronically variable spectrum width. The device operates from a high frequency (MHz) input signal. In a preferred embodiment, a 6 stage digital counter operates from a 192 MHz input signal.

It is a principal object of the invention to provide a new and improved multi-tone jammer.

It is another object of the invention to provide a digital ramp and pattern generator for sweeping a VCO including means for modulating the VCO output whereby a practical multi-tone jammer of improved flatness is realized.

It is another object of the invention to provide a multi-tone jammer having fewer components than devices of known design.

It is another object of the invention to provide a multi-tone jammer that does not require matching phase and amplitude of R.F. components.

It is another object of the invention to provide a multi-tone jammer that in fabrication does not require adjustments or critical component selection.

It is another object of the invention to provide a multi-tone jammer having improved flatness of spectrum and stability of tones.

It is another object of the invention to provide a multi-tone jammer adapted to produce a waveform capable of jamming some or all channels of a multiple channel receiver.

These, together with other objects, features and advantages of the invention, will become more readily apparent from the following detailed description when taken in conjunction with the illustrative embodiment in the accompanying drawings.

DESCRIPTION OF THE DRAWINGS

FIG. 1 is a block diagram of the multi-tone generator of the invention;

FIG. *2a* is a timing diagram of the digital ramp generator; and

FIG. *2b* illustrates the output of the digital/analog converter of FIG. 1.

DESCRIPTION OF THE PREFERRED EMBODIMENT

The purpose of a multi-tone jammer is to produce a waveform which can jam some or all of the channels of a multiple channel receiver. The subject invention comprehends a modulator which drives a single voltage controlled oscillator (VCO) to produce a so-called "comb spectrum" with equi-spaced narrow-band carrier lines. This waveform can be used to test the performance of frequency hopped anti-jam systems.

The operation of the multi-tone jammer set is generally similar to that of most common electronic sweep generators. The frequency of the oscillator is increased linearly with the time between $f_L$ and $F_H$. When the oscillator frequency reaches $f_H$, the oscillator output is shut off and the control voltage is reset to produce the lowest frequency $f_L$. The sweep rate of conventional generator is slow enough that the instantaneous output is well defined and a circuit with a bandwidth small compared to $f_H f_L$ will respond only when the instantaneous frequency falls within its passband.

By contrast, the multi-tone jammer of the invention sweeps the frequency so fast that the circuit sees a series of impulses which cause it to respond as if it were continually excited by a tone. To achieve this effect, the sweep repetition rate must be somewhat greater than the circuit bandwidth. These conditions are readily satisfied in a channelized receiver where the channels are spaced by the bandwidth. When the sweep rate is equal to the bandwidth, a spectrum of tones is produced with tone spacing equal to the channel spacing.

The key parameters of the spectrum are electronically controllable. The number of tones depends on the swept frequency range $f_L$ to $f_H$ which, in turn, depends on the peak to peak sweep voltage. The tone spacing depends on the sweep repetition rate. The amplitudes of the individual tones are nominally equal, although small amplitude variations will result from the non-linear frequency vs applied voltage characteristic of the oscillator.

The present invention differs from the prior art described above in two respects. (1) Prior art devices are intended to produce a slowly changing frequency with the effect of producing only one instantaneously available tone. By contrast the intent of the device of the invention is to produce multiple tones. (2) The rates at which the device operates is much larger than the previous art. By way of example, a device has been built and tested using a sweep repetition rate of 3 MHz. This is in contrast to previous art of less than 1 KHz.

One presently preferred embodiment of the invention is illustrated in block diagram form in FIG. 1. Referring thereto an n stage binary synchronous high speed digital counter 4 is driven by an input signal source (or clock) 5. Input signal source 5 generates a high frequency signal $f_c$, typically 200 MHz. The outputs of digital counter 4 are fed to digital/analog converter 6. The output of digital/analog converter 6 (ramp waveform 11 of FIG. 2*b*) is amplified by amplifier 7 and controls voltage controlled oscillator 8. Digital ramp generator timing is illustrated by FIG. 2*a*. The output of voltage controlled oscillator 8 is modulated by PIN diode attenuator 9 in response to digital pattern generator and blanking circuit 10. The digital pattern generator is synchronized to binary synchronous counter 4 and can comprise conventional high speed logic circuitry including a programmable read only memory (PROM). A conventional blanking circuit effects the desired blanking of the voltage controlled oscillator (for retrace and tone band limiting) by controlling PIN diode bias in response to the programmed output of the PROM.

The digitized ramp is produced by dividing a ramp waveform into binary scaled amplitude, generating a matching binary code at reference frequency fc, and then code to amplitude conversion. Sufficient quantization is desired so as to avoid granularity in the ramp and synchronous code transitions are desired so as to minimize overshoots or undershoots at the digital to analog converter output.

By way of specific example, the digital to analog converter 6 is required to make conversions in the 5 nanosecond region. It can typically consist of a thin film converter with least significant bit (LSB) response time of 5 nanoseconds is driven by a synchronous binary counter of 6 bits. Upon reaching a count of $2^6=64$ (FIG. 2*a*) the counter subsequently clocks to all zeros and causes retrace of the ramp. Straight binary code conversion is done by the digital to analog converter with a resultant repetition of $fc/2^n$, as the binary counter is clocked with reference oscillator fc and has n binary stages. Using the response time of 5 nanoseconds for LSB and a counter of $n=6$ results in fc of 200 MHz and a ramp repetition of 3.125 MHz. Connecting the ramp waveform 11 to VCO 8 after amplification, produced a spectrum of frequency tones over the swept band with tone spacings every 3 MHz.

The spectrum flatness achieved by the device is limited by the frequency versus amplitude response of the VCO. Modulation of VCO output is required so as to "blank" out the retrace of the ramp because the retrace causes undesirable amplitude variation of the output spectrum. Synchronous signals are derived from the digital counter so as to properly position the blanking. The blanking is a function of digital pulse signals driving the PIN diode attenuator inserted at the VCO output.

Additional digital control pulses are inserted into the PIN diode attenuators during the sweep generation for the purpose of producing a partial band tone jamming spectrum. The control for these digital pulses is synchronized to the sweep rate by taking timing signals from the digital counter and processing them with the digital pattern generator as described above.

While the invention has been described in one presently preferred embodiment, it is understood that the words which have been used are words of description rather than words of limitation and that changes within the purview of the appended claims may be made without departing from the scope and spirit of the invention in its broad aspects.

What is claimed is:

1. A multi-tone jammer comprising an n stage binary synchronous counter, n being an integer, a signal source providing a reference frequency signal $f_c$ driving said binary synchronous counter, a digital/analog converter receiving outputs from said binary synchronous counter and generating a ramp waveform output signal therefrom, a voltage controlled oscillator having an output, said voltage controlled oscillator being controlled by the output of said digital/analog converter, and modulator means receiving and modulating the output of said voltage controlled oscillator and outputting a multi-tone jamming signal in response thereto, said modulator means comprising attenuator means connected to control the output of said voltage controlled oscillator, a digital pattern generator receiving a synchronizing signal from said binary synchronous counter and generating voltage controlled oscillator modulation signals, and blanking circuit means controlling said attenuator means in response to said voltage controlled oscillator modulation signals.

2. A multi-tone jammer as defined in claim 1 wherein the reference frequency signal $f_c$ has a frequency in the MHz range.

3. A multi-tone jammer as defined in claim 2 wherein said digital pattern generator provides a voltage controlled oscillator modulation signal adapted to blank the voltage controlled oscillator output during ramp waveform retrace periods.

4. A multi-tone jammer as defined in claim 3 wherein said digital pattern generator provides a voltage controlled oscillator modulation signal adapted to produce a partial band tone jamming spectrum.

5. A multi-tone jammer as defined in claim 4 wherein said digital pattern generator provides a voltage controlled oscillator modulator signal adapted to provide a band tone jamming spectrum of $f_c/2^n$.

6. A multi-tone jammer as defined in claim 5 including means for amplifying the output of said digital/analog converter.

7. A multi-tone jammer as defined in claim 6 wherein said means for modulating the output of said voltage controlled oscillator comprises a PIN diode attenuator.

8. A multi-tone jammer as defined in claim 7 wherein said digital pattern generator includes a programmable read only memory.

9. A multi-tone jammer as defined in claim 8 wherein $f_c$ is approximately 200 MHz and $n=6$.

* * * * *